United States Patent [19]

Katayama

[11] 4,302,984

[45] Dec. 1, 1981

[54] ROLLER BEARING ASSEMBLY

[75] Inventor: Nobuaki Katayama, Toyota, Japan

[73] Assignee: Toyota Jidosha Kogyo Kabushiki Kaisha, Toyota, Japan

[21] Appl. No.: 49,050

[22] Filed: Jun. 15, 1979

[30] Foreign Application Priority Data

Mar. 29, 1979 [JP] Japan .................... 54-37646

[51] Int. Cl.³ .................. F16H 3/08; F16H 57/02; F16C 33/46
[52] U.S. Cl. ...................... 74/375; 74/432; 74/606 R; 308/217
[58] Field of Search ............ 74/329, 330, 331, 362, 74/363, 366, 368, 356, 357, 358, 359, 360, 361, 373, 374, 375, 606 R, 432, 339; 308/216, 217; 29/148.4 A, 149.5 R

[56] References Cited

U.S. PATENT DOCUMENTS

| | | | |
|---|---|---|---|
| 543,262 | 7/1895 | Mossberg | 308/217 |
| 1,117,970 | 11/1914 | Bugatti | 308/217 |
| 1,907,015 | 5/1933 | Swart | 308/217 X |
| 1,981,236 | 11/1934 | Logue | 74/375 |
| 2,096,770 | 10/1937 | Wagner | 74/375 |
| 2,151,132 | 3/1939 | Meyer | 74/359 |
| 2,202,271 | 5/1940 | Sinclair et al. | 74/368 |
| 2,212,279 | 8/1940 | Steinlein et al. | 74/368 |
| 2,397,620 | 4/1946 | Orr | 74/375 |
| 2,445,716 | 7/1948 | Sternberg | 74/745 |
| 2,528,987 | 11/1950 | Ablett | 308/216 |
| 2,682,435 | 6/1954 | Rien et al. | 308/216 X |
| 2,747,430 | 5/1956 | Forster et al. | 74/368 |
| 2,892,358 | 6/1959 | Backus et al. | 74/745 X |
| 3,051,534 | 8/1962 | Kohler et al. | 308/217 |
| 3,184,984 | 5/1965 | Erdman et al. | 74/363 X |
| 3,618,416 | 11/1971 | Longshore | 74/375 X |
| 3,645,147 | 2/1972 | Fodrea | 74/745 X |

FOREIGN PATENT DOCUMENTS

| | | | |
|---|---|---|---|
| 483323 | 5/1952 | Canada | 74/368 |
| 1197711 | 7/1965 | Fed. Rep. of Germany | 74/329 |

Primary Examiner—Allan D. Herrmann
Attorney, Agent, or Firm—Cushman, Darby & Cushman

[57] ABSTRACT

A roller bearing assembly including a surface of a shaft serving as an inner race for rolling bodies, the surface having a diameter smaller than the outer diameter of a gear formed integrally with the shaft, a cylindrical outer race of a larger inner diameter than the outer diameter of the gear, and a cage for the rolling bodies composed of two halves formed by splitting the cage radially of the shaft, whereby the gear of a small outer diameter can be formed integrally with the shaft of a large diameter to thereby increase the rigidity of the shaft.

5 Claims, 3 Drawing Figures

ROLLER BEARING ASSEMBLY

BACKGROUND OF THE INVENTION

This invention relates to roller bearing assemblies, and more particularly to a roller bearing assembly suitable for use with speed change gearing, for example, having a plurality of large and small gears mounted on a single shaft so as to increase the rigidity of the gear and prevent vibration, noise, wear and damage which would otherwise be caused to occur by a reduction in the rigidity of the shaft.

The bearing assembly of the type described is suitable for use with a shaft required to have high strength. In recent years, automotive vehicles for transporting passengers have to be equipped with a multistage transmission in order to minimize fuel consumption while maintaining motive power at a level high enough to travel in a wide range of travelling conditions including a travel on expressways, a travel on city roads where traffic is so heavy that the roads are congested, a travel on uphill roads in a mountainous region and a travel on a tortuous road. Such speed change gearing is limited by dimensions, cost, weight and other conditions and is required to be inexpensive, light in weight and compact in size.

SUMMARY OF THE INVENTION

An object of this invention is to provide a roller bearing assembly suitable for use with speed change gearing which meets the aforesaid requirements.

Another object is to provide a roller bearing assembly comprising a cage of the split type to permit a shaft to be inserted in the bearing assembly by forming a gear integral with the shaft instead of attaching the gear to the shaft by spline connection, so that the shaft having the gear formed integrally therewith can be inserted in a bearing assembly of a diameter so small that the shaft with the integral gear could not otherwise by inserted therein. By this feature, the rigidity of the shaft can be increased with small expenses and a potential source of trouble, such as vibration, noise or wear, can be removed, while the roller bearing assembly can have its precision increased and its service life prolonged.

Still another object is to provide a roller bearing assembly wherein the surface of a shaft serving as an inner race for rolling bodies has a diameter smaller than the outer diameter of a gear and an outer race of the bearing assembly has an inner diameter greater than the outer diameter of the gear, so that the roller bearing assembly of light weight and compact size can be obtained at low cost, even if limitations are placed on the bearing assembly by dimensions, weight and cost.

When incorporated in a manual transmission for automotive vehicles for transporting passengers, for example, the present invention makes it possible to greatly increase the diameters of portions of a countershaft on which a countershaft reverse gear and a countershaft 5-speed gear are mounted, as contrasted with a manual transmission of the prior art, so that the countershaft can have high rigidity, vibration and noise can be minimized, and the service life of the bearing assembly can be prolonged because of a reduction in the tilting of the countershaft. The increase in the diameter of the countershaft at which the spline for connecting the countershaft 5-speed gear is provided enables fretting of the spline to be reduced.

An additional advantage is that formation of the countershaft reverse gear integrally with the countershaft eliminates the need to effect machining for providing a spline for connecting the gear to the countershaft, so that cost can be reduced and at the same time the precision with which the reverse gear is assembled can be increased as a result of elimination of spline connection.

DESCRIPTION OF THE PREFERRED EMBODIMENT

A preferred embodiment of the present invention will now be described by referring to the accompanying drawings.

Figure 1:
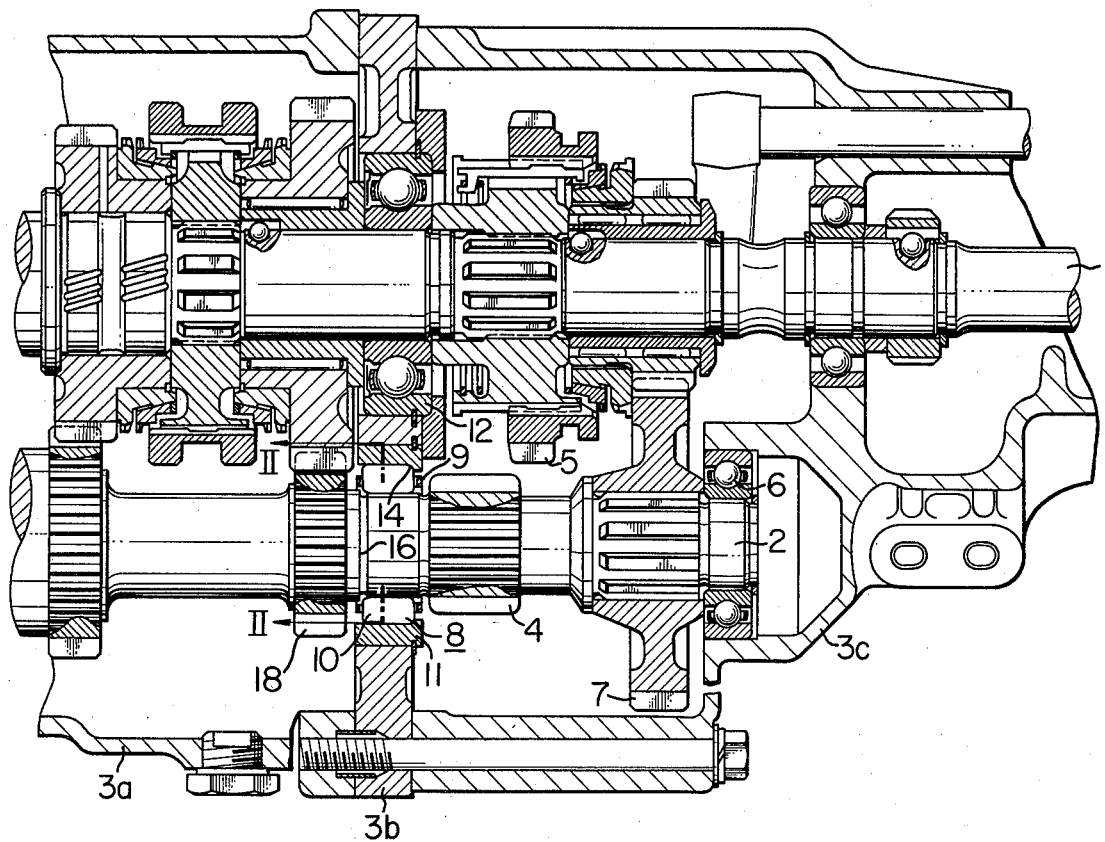
FIG. 1 is a sectional view of the essential portions of a manual transmission for automotive vehicles incorporating therein one embodiment of the present invention.

The embodiment is shown as being incorporated in a manual transmission for automotive vehicles. In FIG. 1, an output shaft 1 and a countershaft 2 are located parallel to each other and rotatably supported by a transmission case 3a, an intermediate plate 3b and an extension housing 3c. Gears are formed integrally with the shafts or attached thereto by spline connection. A countershaft reverse gear 4 is selectively brought into meshing engagement with a reverse gear 5 on the output shaft 1 through a reverse idler gear, not shown. The countershaft 2 has at its right end portion a ball bearing 6, a countershaft 5-speed gear 7, the countershaft reverse gear 4 and a countershaft center bearing 8. The countershaft reverse gear 4 is formed integrally with the countershaft 2, and the countershaft 5-speed gear 7 is attached to the countershaft 2 by spline connection. In a countershaft of the prior art, the countershaft reverse gear has hitherto been attached to the countershaft by spline connection. This arrangement has been inevitable because of the fact that a difficulty is encountered in assembling the parts of the transmission since the volume of the outer diameter of an output shaft center bearing 12, the thickness of the intermediate plate 3b (transmission case) and the bulk of the bearing make the inner diameter of the inner race of the countershaft center bearing 8 smaller than the outer diameter of the countershaft reverse gear 4. When the countershaft reverse gear is attached to the countershaft by spline connection after the latter is inserted in the countershaft center bearing which is constructed as a unitary structure as aforesaid, some difficulty would be encountered. That is, since the countershaft reverse gear has an outer diameter which is too small as compared with the diameter which the countershaft is required to have, the spline would have too small a diameter if the root of tooth of the countershaft reverse gear had a sufficiently large thickness, thereby reducing the rigidity of the countershaft. The same goes for the spline for connecting the countershaft 5-speed gear to the countershaft. Thus the countershaft would be flexed and vibration and noise would be caused by changes in tooth bearing when the gears mesh with each other, thereby making fretting of the spline inevitable. Also, tilting of the countershaft would shorten the service life of the bearing.

The countershaft center bearing 8 according to the present invention is not formed as a unitary structure and is constructed by assembling parts, so that it is possible to form the countershaft reverse gear 4 integrally with the countershaft 2.

Figure 2:
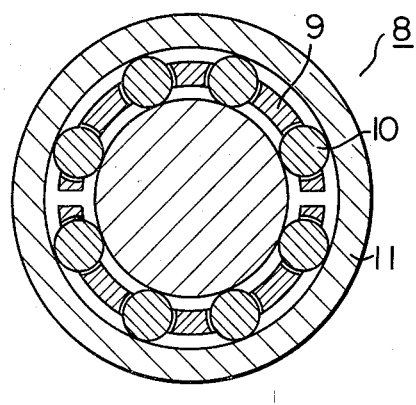
FIG. 2 is a sectional view taken along the line II—II in FIG. 1.
Figure 3:
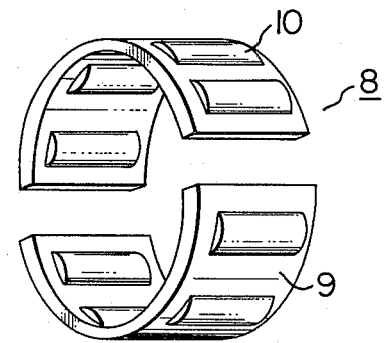
FIG. 3 is an exploded perspective view of the countershaft center bearing shown in FIG. 2.

More specifically, the countershaft center bearing 8 includes a cage 9 split into upper and lower halves in a plane including the axis of rotation as shown in FIGS. 2 and 3. Thus the countershaft center bearing 8 comprises a surface of the countershaft 2 having the countershaft reverse gear 4 formed integrally therewith, the cage 9 split into two halves to support rollers 10, and a cylindrical outer race 11. In this case, as shown in FIG. 1, the intermediate plate 3b is formed with an opening for mounting the outer race 11 below the output shaft center bearing 12 of the output shaft 1, and the outer race 11 mounted in this opening has an inner diameter greater than the outer diameter of the countershaft reverse gear 4. This is because the countershaft reverse gear 4 must pass through the center bearing 8 when the countershaft 2 is inserted in the bearing 8, in assembling the bearing 8. The surface of the countershaft 2 serving as an inner race for the rollers 10 has an outer diameter smaller than the outer diameter of the countershaft reverse gear 4, because limitations are placed by the outer diameter of the output shaft center bearing 12, the thickness of the transmission case 3a and the bulk of the bearing. Thus, it is possible to assemble the countershaft as shown in FIG. 1 even if the countershaft reverse gear is formed integrally with the countershaft.

Another gear 18 may be formed integrally with the countershaft 2 on the opposite or far side of the bearing 8 from the gear 4. This gear 18 may have an outer diameter greater than the inner diameter of the outer race 11.

The outer race 11 has an interior shoulder 14 at the side adjacent the gear 4 while the countershaft 2 has an enlargement thereon defining a shoulder 16 adjacent the other side of the bearing 8 and facing the shoulder 14. The rollers 10 are thus confined between these shoulders 14 and 16 so that the cage 9 cannot contact the gears 4 and 18 with resulting vibration and noise.

What is claimed is:
1. A roller bearing assembly comprising:
    a surface of a shaft serving as an inner race for rolling bodies, said surface having a diameter smaller than the outer diameter of a gear formed integrally with the shaft;
    a cylindrical outer race for the rolling bodies of a larger inner diameter than the outer diameter of the gear; and
    a cage for the rolling bodies composed of two halves formed by splitting the cage radially of the shaft, said outer race having an interior shoulder adjacent one side of said bearing assembly and said shaft being enlarged to define a shoulder facing said race shoulder adjacent the other side of said assembly, whereby to confine said rolling bodies between said shoulders.
2. A roller bearing assembly as set forth in claim 1, wherein said gear is a countershaft reverse gear of a transmission.
3. A roller bearing assembly as set forth in claim 1, wherein said shaft is parallel to an output shaft of a transmission, and an intermediate plate is formed with an opening for mounting said outer race below an output shaft center bearing of said output shaft.
4. A roller bearing assembly as set forth in claim 1, wherein another gear is attached to said shaft by spline connection on the far side of said integrally formed gear with respect to said surface.
5. A roller bearing assembly as set forth in claim 1, wherein said surface is between said gear and another gear formed integrally with the shaft.

* * * * *